United States Patent Office 2,936,317
Patented May 10, 1960

---

2,936,317

NEW MIXED ALCOHOLATES-PHENOLATES OF ALUMINUM AND A PROCESS FOR THE PRODUCTION THEREOF

Herbert Arnold, Rolf Rebling, and Albert Erhardt, Bielefeld, Germany, assignors to Asta-Werke Aktiengesellschaft Chemische Fabrik, Brackwede, Germany No Drawing. Application May 12, 1958
Serial No. 734,414

Claims priority, application Germany May 17, 1957

10 Claims. (Cl. 260—448)

The present invention relates to a new mixed alcoholates-phenolates of aluminum and to a process for the production thereof.

The new mixed alcoholates-phenolates of aluminum provided by the present invention correspond to the following Formula I:

wherein R represents a member of the group consisting of the alkyl radicals with 2–9 carbon atoms and the cyclohexyl radical, R′ represents a member of the group consisting of the 4-nitrophenyl group, the 2,4-dinitrophenyl group, and the 2,4-dinitro-1-naphthyl group, and R″ represents a member of the group consisting of the alkyl radicals with 2–9 carbon atoms, the cyclohexyl radical, the 4-nitro phenyl group, the 2,4-dinitro phenyl group, and the 2,4-dinitro-1-naphthyl group.

A preferred embodiment of the invention provides products of the above general Formula I wherein R has the same meaning as defined above, R′ represents the 2,4-dinitro-1-naphthyl-group, and R″ represents a member of the group consisting of the 4-nitro phenyl group, the 2,4-dinitro phenyl group, and the 2,4-dinitro-1- naphthyl group. Preferably R′ and R″ represent each a 2,4-dinitro-1-naphthyl-group.

The products of the general Formula I can be prepared by reacting 1 mole of a compound of the general Formula II:

wherein R has the same meaning as in the general Formula I, with 1–3 moles of a member of the group consisting of the 4-nitro phenol, the 2,4-dinitro phenol, and the 2,4-dinitro-1-naphthol and -1-naphthols. The reaction is preferably carried out in the presence of a solvent being capable of dissolving at least part of the reaction components. As solvents one may for example use benzene, toluene or xylene, alcohols in which the aluminum alcoholates used are soluble, chlorinated aliphatic hydrocarbons, for example carbon tetrachloride or dichloroethane and hydrogenated or partially hydrogenated aromatic solvents, for example tetralin. Mixtures of the aforementioned solvents can be used, if desired.

The speed of the reaction and the extent to which the radicals R of the aluminum alcoholate used as starting material are replaced by the radicals of the nitro phenols or naphthol in question depend on the proportions of the components and on the reaction conditions, especially the reaction medium. When an alcohol corresponding to the radical R is used as reaction medium, for example, this replacement takes place practically instantaneously, whereas when an aromatic hydrocarbon, for example benzene, is used it is necessary to heat the reaction mixture for instance to the boiling point of the solvent in question or to allow the reaction mixture to stand for a longer period.

When reacting equimolar quantities of the reaction components one radical R of the compound of the general Formula II is replaced by the radical of the nitro phenol or naphthol. When using two moles of the nitro phenol or naphthol and one mole of the compound of the general Formula II, two radicals R are replaced by the radical of the nitro phenol or naphthol. In this case an excess of the phenolic starting component may be used since the third radical R is not displaced even when a large excess of the phenolic component is used.

The new products form colored crystalline compounds which are insoluble in most organic solvents and nearly insoluble in water; they do not possess definite melting points, but decompose when heated to higher temperatures. This is due to the organic/inorganic character of the compounds in question.

The new products according to our invention can be used therapeutically as specific agents against hookworm infections.

The following Table 1 shows the doses that proved to be fully or partly effective against the so-called ancylostomiasis of the cat. The treatment of the sick animals with the compounds in question was carried out in accordance with the following publications:

Erhardt, A.: Testierungsmethode Ancylostoma-wirksamer Präparate und ihre therapeutischen Untersuchungen an der Ancylostomiasis der Katze. Deutsche Tropenmedizin. Monatsschrift 42, 108 (1938);

Brumpt, E., Neveu-Lemaire, M. und Erhardt, A.: Praktischer Leitfaden der Parasitologie des Menschen. 2. Auflage, Springer-Verlag 1951.

TABLE 1

| Compound used | Fully effective dosis, mg./kg. | Partly effective dosis, mg./kg. |
|---|---|---|
| Example 8 | | 10 |
| Example 9 (n-butyl-comp.) | 20–40 | |
| Example 11 | 7 | |
| Example 10 | | 30 |

The invention is further illustrated by the following examples:

*Example 1—Diisopropyl-[2,4-dinitronaphthyl-(1)]-aluminum alcoholate*

4 g. of 2,4-dinitro-1-naphthol purified by way of its ammonium salt are dissolved in 20 cc. of warm tetralin. Approximately 60–80 cc. of absolute isopropyl alcohol are then added and a hot filtered solution of 3.49 g. of molten aluminum isopropylate in 10 cc. of tetralin is added dropwise without delay to the heated solution while stirring. Orange-colored diisopropyl-[2,4-dinitronaphthyl-(1)]-aluminum alcoholate spontaneously precipitates, and this substance is filtered off with suction while still hot, washed with absolute ether and dried in vacuo. Yield: 4.8 g., i.e. 74.2% of the theoretical yield.

*Example 2.—Di-n-butyl-[2,4-dinitronaphthyl-(1)]-aluminum alcoholate*

4 g. of 2,4-dinitro-1-naphthol are dissolved in 20 cc. of warm tetralin, mixed with 60 cc. of absolute n-butanol and heated. A hot solution of 4.20 g. of aluminum tri-n-butylate in 10 cc. of tetralin is added to the first-mentioned solution while stirring. The result is di-n-butyl-[2,4-dinitronaphthyl-(1)]-alumium alcoholate in a yield of 5.5 g. (79.1% of the theoretical yield). This product is worked up as described in Example 1.

Example 3.—Diisopropyl-[2,4-dinitronaphthyl-(1)]-aluminum alcoholate 5 g. of 2,4-dinitro-1-naphthol purified by way of its ammonium salt are dissolved in a mixture of 160 cc. of absolute isopropyl alcohol and 80 cc. of dry benzene, and a hot solution of 1.46 g. of aluminum triisopropylate in a mixture of 35 cc. of absolute isopropyl alcohol and 15 cc. of dry benzene is added dropwise without delay to the heated solution while stirring. Orange-colored diisopropyl-[2,4-dinitronaphthyl-(1)]-aluminum alcoholate spontaneously precipitates; this substance is filtered off with suction while still hot, subjected to extraction while hot with dry benzene, washed with absolute ether and dried in a vacuum drier. Yield: 74.2% of the theoretical yield.

Example 4.—Di-n-butyl-[2,4-dinitronaphthyl-(1)]-aluminum alcoholate 5.7 g. of 2,4-dinitro-1-naphthol are dissolved in 250 cc. of absolute n-butanol and added dropwise to 2 g. of aluminum tri-n-butylate in 25 cc. of absolute n-butanol while hot and while stirring. The di-n-butyl-[2,4-dinitronaphthyl-(1)]-aluminum alcoholate which is formed immediately precipitates as an orange-colored precipitate, which is filtered off with suction while still hot, is subjected to extraction with dry boiling benzene, washed with absolute ether and dried in vacuo. Yield: 2 g. (60.5% of the theoretical yield).

Example 5.—Ethyl-bis-[p-nitrophenol]-aluminum alcoholate

A solution of 5 g. of aluminum triethylate in 50 cc. of dry benzene is quickly added dropwise to a boiling solution of 15 g. of p-nitrophenol in 130 cc. of dry benzene while stirring, and the mixture is heated for 2 hours to the boiling point. This results in the precipitation of ethyl-bis-[p-nitrophenol]-aluminum alcoholate, which is filtered off with suction while still not, subjected to extraction while hot with dry benzene, washed with absolute ether and dried in vacuo. Yield: 9.5 g. (88.5% of the theoretical yield).

Example 6.—Ethyl-bis-[2,4-dinitrophenol]-aluminum alcoholate

A solution of 0.02 mol of aluminum triethylate in 25 cc. of dry benzene is quickly added dropwise to a boiling solution of 0.07 mol of pure 2,4-dinitrophenol in 120 cc. of dry benzene, and the mixture is heated for 2 hours to the boiling point of the solvent. 7.5 g. of product are obtained after working up as described in Example 5.

Example 7.—Diethyl-[2,4-dinitronaphthyl-(1)]-aluminum alcoholate

A solution of 1.6 g. of aluminum triethylate in 10 cc. of dry benzene is added to a solution of 7 g. of 2,4-dinitro-1-naphthol in 150 cc. of dry benzene and the reaction mixture is allowed to stand overnight at room temperature. The reaction product which precipitates is subjected to extraction while hot with dry benzene, washed with absolute ether and dried in vacuo. 2.1 g. of diethyl-[2,4-dinitronaphthyl-(1)]-aluminum alcoholate are obtained, this being 60% of the theoretical yield.

Example 8.—Ethyl-bis-[2,4-dinitronaphthyl-(1)]-aluminum alcoholate

A solution of 8.1 g. of aluminum triethylate (0.05 mol) in 80 cc. of dry benzene is quickly added dropwise to a boiling solution of 40.95 g. of 2,4-dinitro-1-naphthol (0.175 mol) in 400 cc. of dry benzene while stirring. The mixture is heated for 2 to 10 hours to the boiling point of the solvent, and the reaction product which precipitates is filtered off with suction while still hot, is again subjected to extraction while hot with dry benzene for removing unreacted 2,4-dinitronaphthol and is dried in vacuo after washing with absolute ether. 22 g. of ethyl-bis-[2,4-dinitronaphthyl-(1)]-aluminum alcoholate are obtained, this representing 82% of the theoretical yield.

Example 9.—Butyl-bis-[2,4-dinitronaphthyl-(1)]-aluminum alcoholate

A solution of 5 g. of aluminum sec. butylate in 50 cc. of dry benzene is added to a boiling solution of 14.2 g. of 2,4-dinitro-1-naphthol in 140 cc. of dry benzene while stirring, and the mixture is heated for another 3 hours to the boiling point. The reaction product which precipitates is filtered off with suction while still hot, subjected to extraction with dry benzene while hot for removing unreacted 2,4-dinitronaphthol and dried in vacuo after washing with absolute ether. 8.5 g. of sec. butyl-bis-[2,4-dinitronaphthyl-(1)]-aluminum alcoholate are obtained, this representing 73.8% of the theoretical yield.

By using aluminum-n-butylate the n-butyl-bis-[2,4,-dinitronaphthyl-(1)]-aluminum alcoholate is obtained.

Example 10.—Isoamyl-bis-[2,4-dinitronaphthyl-(1)]-aluminum alcoholate

A solution of 6 g. of aluminum isoamylate in 60 cc. of dry benzene is added to a boiling solution of 14.6 g. of 2,4-dinitro-1-naphthol in 140 cc. of dry benzene and heated for another three hours to the boiling point. The reaction product which precipitates is worked up as described in Example 9; 10 g. of isoamyl-bis-[2,4-dinitronaphthyl-(1)]-aluminum alcoholate are obtained, the yield corresponding to 82.7% of the theoretical yield.

Example 11.—Isopropyl-bis-[2,4-dinitronaphthyl-(1)]-aluminum alcoholate

A solution of 5 g. of aluminum isopropylate in 40 cc. of 1,2-dichloro ethane is added to a solution of 11.4 g. of 2,4-dinitro-1-naphthol in 60 cc. of 1,2-dichloro ethane while stirring and heated for another 4 to 6 hours to the boiling point. The reaction product which precipitates is filtered off with suction while still hot, is subjected to extraction while hot with dry benzene for removing unreacted 2,4-dinitronaphthol and is dried in vacuo after washing with absolute ether.

Example 12.—Isopropyl-bis-[2,4-dinitronaphthyl-(1)]-aluminum alcoholate 515 g. (2.2 mol) of 2,4-dinitro-1-naphthol are dissolved in 2000 cc. of dry benzene. A solution of 204 g. (1.0 mol) of aluminum isopropylate in 750 cc. of dry benzene is slowly added to the solution mentioned before. The reaction mixture is then heated to boiling for about 6 to 8 hours whereby the reaction product precipitates. The reaction mixture is filtered off with suction while still hot, washed with dry benzene and extracted for about 20 hours in a Soxhlet apparatus with about 3000 cc. of dry benzene in order to remove unreacted starting materials. After this the benzene is sucked off and the reaction product is dried in vacuo. 534 g. of isopropyl-bis-[2,4-dinitronaphthyl-(1)]-aluminum alcoholate are obtained in the form of orange-colored crystals. Yield: 96.7% of the theoretical yield.

Example 13.—n-Hexyl-bis-[2,4-dinitronaphthyl-(1)]-aluminum alcoholate

The product is obtained by reacting 2,4-dinitro-1-naphthol and aluminum-n-hexylate in dry benzene in accordance with Example 12.

Example 14.—n-Heptyl-bis-[2,4-dinitronaphthyl-(1)]-aluminum alcoholate

The product is obtained by reacting 2,4-dinitro-1-naphthol and aluminum-n-heptylate in dry benzene in accordance with Example 12.

Example 15.—Cyclohexyl-bis-[2,4-dinitronaphthyl-(1)]-aluminum alcoholate

A solution of 16.2 g. (0.05 mol) of aluminum-cyclohexylate in 150 cc. of dry benzene is added while stirring to a boiling solution of 25.7 g. (0.11 mol) of 2,4-dinitro-1-naphthol in 250 cc. of dry benzene. The reaction mixture is heated to boiling for about 6 hours whereby the reaction product precipitates. It is sucked off while hot, washed with dry benzene and extracted with dry benzene in order to remove unreacted starting materials. Then the benzene is sucked off and the reaction product is dried in vacuo. Yield: 27 g. of cyclohexyl-bis-[2,4-dinitro-naphthyl-(1)]-aluminum alcoholate, i.e. 91.2% of the theoretical yield, in the form of orange-colored crystals.

What we claim is:

1. The compound of the formula $$RO-Al-OR'$$
$$\quad\;\;\;|$$
$$\quad\;\;OR''$$

wherein

R represents a member selected from the group consisting of the alkyl radicals with 2 to 9 carbon atoms and the cyclohexyl radical, R' represents a member selected from the group consisting of the 4-nitro phenyl group, the 2,4-dinitro phenyl group, and the 2,4-dinitro-1-naphthyl group, and R'' represents a member selected from the group consisting of the alkyl radicals with 2 to 9 carbon atoms, the cyclohexyl radical, the 4-nitro phenyl group, the 2,4-dinitro phenyl group, and the 2-4-dinitro-1-naphthyl group.

2. The isopropyl-bis-[2,4-dinitronaphthyl-(1)]-aluminum alcoholate.

3. The [2,4-dinitro naphthyl-(1)]-alumnium alcoholates of the formula

[structural formula with two 2,4-dinitronaphthyl groups linked through O-Al(OR)-O]

wherein

R is an alkyl radical with 2 to 9 carbon atoms.

4. The [2,4-dinitro naphthyl-(1)]-aluminum alcoholates of the formula

[structural formula with two 2,4-dinitronaphthyl groups linked through O-Al(OR)-O]

wherein

R is the cyclohexyl radical.

5. The ethyl bis-[2,4-dinitro naphthyl-(1)]-aluminum alcoholate.

6. The butyl bis-[2,4-dinitro naphthyl-(1)]-aluminum alcoholate.

7. The isoamyl bis-[2,4-dinitro naphthyl-(1)]-aluminum alcoholate.

8. The process of producing a compound of the formula $$RO-Al-OR'$$
$$\quad\;\;\;|$$
$$\quad\;\;OR''$$

wherein

R represents a member selected from the group consisting of the alkyl radicals with 2 to 9 carbon atoms and the cyclohexyl radical, R' represents a member selected from the group consisting of the 4-nitro phenyl group, the 2,4-dinitro phenyl group, and the 2,4-dinitro-1-naphthyl group, and R'' represents a member selected from the group consisting of the alkyl radicals with 2 to 9 carbon atoms, the cyclohexyl radical, the 4-nitro phenyl group, the 2,4-dinitro phenyl group, and the 2,4-dinitro-1-naphthyl group, which process consists in reacting 1 mole of an aluminum trialcoholate of the formula $$Al(OR)_3$$

wherein

R represents a member selected from the group consisting of the alkyl radicals with 2 to 9 carbon atoms and the cyclohexyl radicals, with 1 to 3 moles of a compound selected from the group consisting of 4-nitro phenol, 2,4-dinitro phenol, and 2,4-dinitro-1-naphthol in the presence of a solvent at a temperature not exceeding the boiling point of the reaction mixture, and filtering off the resulting reaction product.

9. The process according to claim 8 in which the aluminum tri-alcoholate is reacted with 1–3 moles of 2,4-dinitro-1-naphthol.

10. The process according to claim 8, in which the solvent is an aromatic hydrocarbon selected from the group consisting of benzene, toluene and xylene.

References Cited in the file of this patent

FOREIGN PATENTS 731,216   Great Britain _____ June 1, 1955

OTHER REFERENCES

Mehrotra: Journ. Indian Chem. Soc., vol. 30, No. 9 (1953), pp. 585 to 591.